(12) United States Patent
Dai et al.

(10) Patent No.: US 11,340,807 B2
(45) Date of Patent: May 24, 2022

(54) MOUNTING A SHARED DATA STORE OF A SERVER CLUSTER ON A CLIENT CLUSTER FOR USE AS A REMOTE DATA STORE

(71) Applicant: VMware, Inc., Palo Alto, CA (US)

(72) Inventors: Peng Dai, Boston, MA (US); Mansi Shah, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 253 days.

(21) Appl. No.: 16/718,109

(22) Filed: Dec. 17, 2019

(65) Prior Publication Data
US 2021/0181962 A1    Jun. 17, 2021

(51) Int. Cl.
*G06F 3/06* (2006.01)

(52) U.S. Cl.
CPC .......... *G06F 3/0635* (2013.01); *G06F 3/0604* (2013.01); *G06F 3/065* (2013.01); *G06F 3/067* (2013.01); *G06F 3/0665* (2013.01)

(58) Field of Classification Search
CPC ........ G06F 3/0635; G06F 3/067; G06F 3/065; G06F 3/0665; G06F 3/0604; G06F 3/0644; G06F 3/0605
See application file for complete search history.

(56) References Cited

U.S. PATENT DOCUMENTS

| 8,838,658 B2* | 9/2014 | Moore | G06F 11/1464 707/822 |
| 2013/0232261 A1* | 9/2013 | Wright | H04L 41/5009 709/224 |
| 2020/0250080 A1* | 8/2020 | Yao | G06F 3/0611 |

* cited by examiner

*Primary Examiner* — Michelle T Bechtold (57) ABSTRACT

The disclosure herein describes mounting a shared data store, remote from a client cluster, as a remote data store on the client cluster. An abstraction interface of the remote data store on the client cluster is configured to receive data operations that are in a local data store-based format. A control path interface is established between the server cluster and the client cluster, and network location data associated with the shared data store is received by the client cluster via the established control path interface. Based on the network location data, a data path interface is established between the client cluster and the shared data store of the server cluster, whereby data operations directed to the abstraction interface of the remote data store on the client cluster are routed to the shared data store of the server cluster via the established data path interface.

20 Claims, 8 Drawing Sheets

MOUNTING A SHARED DATA STORE OF A SERVER CLUSTER ON A CLIENT CLUSTER FOR USE AS A REMOTE DATA STORE

BACKGROUND

Hyperconverged infrastructure (HCI) systems with fixed computation to storage ratios and homogeneous storage classes are widely adopted in both on-premise and cloud environments for the simplicity, scalability, and economics they offer, as determined by the hardware constraints, software limitations, and business considerations. However, the fixed computation resource to storage resource ratio results in a lack of independent scaling of those resources and leads to "stranded capacity", where one or more types of resources in a cluster can be left idle. Such efficiency issues are exacerbated when clusters are deployed at scale.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 8, the systems are illustrated as schematic drawings. The drawings may not be to scale.

DETAILED DESCRIPTION

Aspects of the disclosure provide a computerized method and system for remotely mounting a shared data store as a remote data store on a client cluster. A processor of the client cluster receives a request to mount the shared data store of a server cluster as a remote data store of the client cluster. In response, an abstraction interface of the remote data store is configured to be exposed to entities of the client cluster and to receive data operations that are in a local data store-based format. A control path interface is established between the server cluster and the client cluster and network location data associated with the shared data store is received by the client cluster. Based on the network location data, a data path interface is established between the shared data store of the server cluster and the remote data store of the client cluster, whereby the shared data store of the server cluster is mounted as the remote data store of the client cluster such that data operations directed to the abstraction interface of the remote data store of the client cluster are routed to the shared data store of the server cluster via the established data path interface.

The disclosure addresses the challenges of preventing "stranded capacity" in hyperconverged infrastructure (HCI) systems and enabling the sharing of data store capacity across clusters within such systems. By providing for remote use of shared data stores on server clusters, independent scaling of computation and storage resources across clusters is enabled and more efficient use of storage resources via storage tiers is allowed. The disclosure operates in an unconventional way at least by enabling the discovery and mounting of shared data stores as remote data stores on client clusters while maintaining the same experience for entities within the client clusters, including use of interfaces and features for accessing the remote data stores, such as data path, control path, storage policy-based management, and other related HCI management. Customers' use of the described features in an HCI system improves efficiency of storage resource use and thereby reduces the customers' costs associated with the system. For instance, rather than deploying additional clusters when only additional storage resources are needed, available shared data stores are leveraged, saving the customer the cost of deploying the additional clusters. Further, the human-machine interface and user experience are enhanced as additional storage may be made available without interruption to the user.

Figure 1:
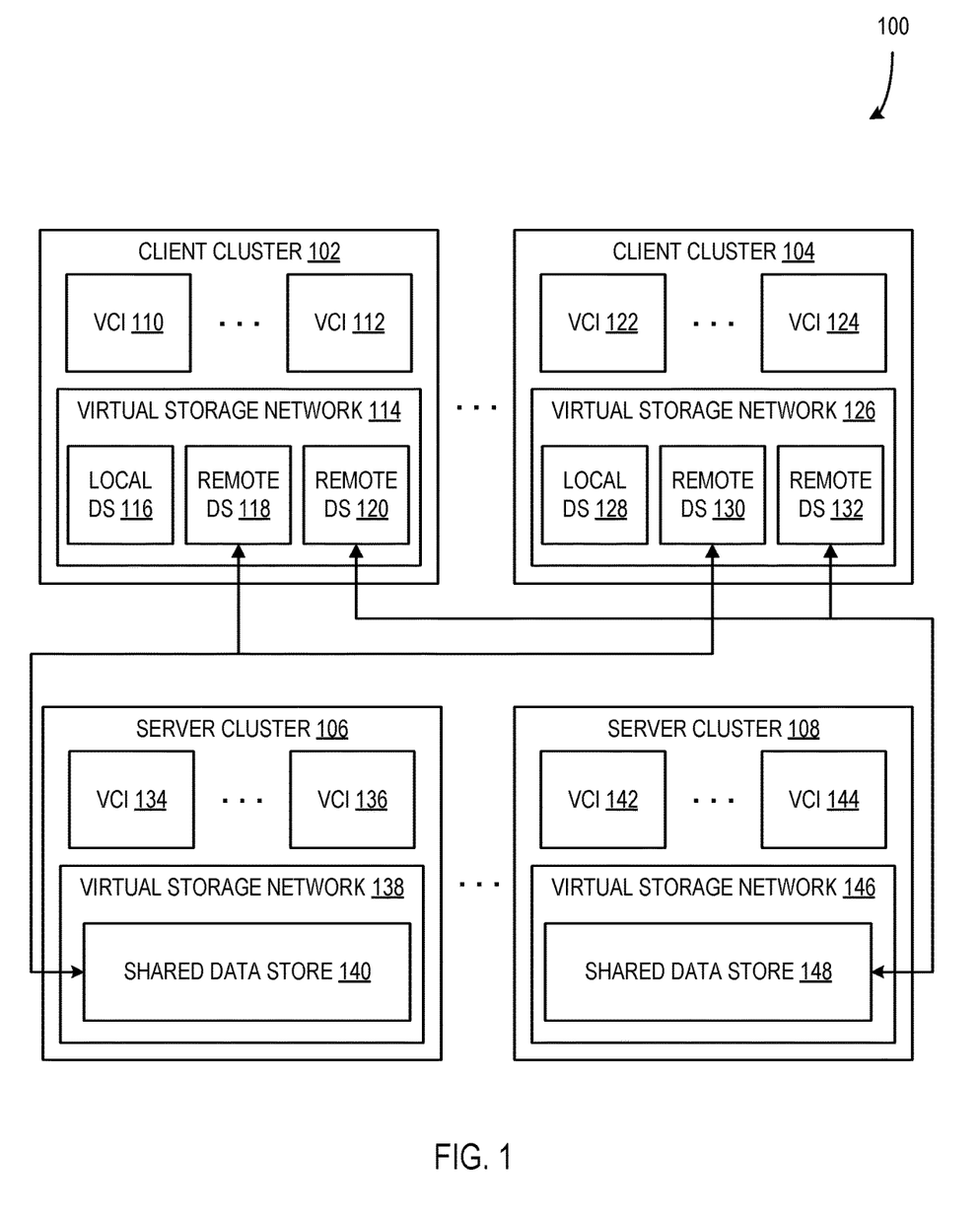
FIG. 1 is a block diagram illustrating a system configured for enabling client clusters to mount shared data stores of server clusters as remote data stores according to an embodiment.

FIG. 1 is a block diagram illustrating a system 100 configured for enabling client clusters 102-104 to mount shared data stores 140 and 148 of server clusters 106-108 as remote data stores of client clusters 102-104 according to an embodiment. In some examples, the client clusters 102-104 and the server clusters 106-108 are components in an HCI system that is configured to host virtual computing instances (VCIs) such as virtual machines (VMs), container-based VCIs, or the like (e.g., VCIs 110-112, 122-124, 134-136, and 142-144). It should be understood that VCIs instantiated, managed, and/or otherwise hosted in the system 100 may be any type of VCI without departing from the description herein. Alternatively, or additionally, the system 100 are generally operable in non-virtualized implementations and/or environments without departing from the description herein.

In addition to the VCIs hosted on the clusters, the clusters 102, 104, 106, and 108 each include virtual storage networks 114, 126, 138, and 146 respectively. Each virtual storage network is a component of a cluster that virtualizes storage of data that is used by the VCIs hosted on the cluster and/or other components of the cluster. In some examples, the virtual storage networks 114, 126, 138, and 146 are configured as VMWARE Virtual Storage Area Networks (vSANs). Within the virtual storage networks, data stores (DSs) are stored and managed (e.g., local DSs 116 and 128, remote DSs 118, 120, 130, and 132, and shared data stores 140 and 148). The data stores in the virtual storage networks may be stored in the form of data objects, container-based data stores, file system-based data stores, databases, or other types of data stores without departing from the description herein. In examples where the virtual storage networks are configured as vSANs, the data stores are configured based on Storage Policy-Based Management (SPBM).

Each of the client clusters 102 and 104 are configured to include a local data store (e.g., local data stores 116 and 128 respectively) that is configured to store the data within the respective client cluster. For instance, the data stored in the local data store 116 of the client cluster 102 may include data associated with one of the VCIs 110-112 hosted on the client cluster 102 and/or data associated with other components of the client cluster 102, such as metadata used during management and/or hosting of the VCIs 110-112. In further examples, each of the server clusters 106-108 are also configured to include local data stores that are not used as shared data stores and are not pictured.

In addition to the local data stores 116 and 128, the client clusters 102 and 104 are configured to each have two mounted remote data stores. The client cluster 102 is configured with a remote data store 118 mounted for accessing the shared data store 140 of the server cluster 106 and a remote data store 120 mounted for accessing the share data store 148 of server cluster 108. The client cluster 104 is configured with a remote data store 130 mounted for accessing the shared data store 140 of the server cluster 106 and a remote data store 132 mounted for accessing the share data store 148 of server cluster 108. The remote data stores described herein, when mounted in a client cluster, are linked to a shared data store on another cluster (e.g., server clusters 106 and/or 108), such that data stored by the client cluster and/or components thereof on the remote data store is transferred or routed from the client cluster to the associated shared data store of the linked server cluster. In this way, the client cluster is configured to enable hosted VCIs and other components to make use of available storage capacity of the server cluster. In some examples, the link(s) or interface(s) established between the remote data stores and shared data stores are configured such that hosted VCIs on the client cluster are enabled to interact with the remote data stores using the same operations and/or methods that they use to interact with the local data store(s) of that client cluster. The mounting of the remote data stores and associated formation of links or interfaces to shared data stores on server clusters is described in greater detail herein.

It should be understood that, while the client clusters are illustrated as having mounted remote data stores to shared data stores on the server clusters, in other examples, a server cluster may include a remote data store mounted to make use of a shared data store on another server cluster or on a client cluster. Further, a client cluster may include a remote data store mounted to make use of a share data store on another client cluster. As such, a "client cluster" may behave as a "server cluster" to another cluster when it shares a data store and that other cluster mounts a remote data store to the share data store and a "server cluster" may behave as a "client cluster" to another cluster when it mounts a remote data store to a data store being shared by the other cluster. Further, it should be noted that shared data stores (e.g., shared data stores 140 and 148) of server clusters may be mounted as, or otherwise linked to, multiple remote data stores (e.g., shared data store 140 is mounted as remote data store 118 in client cluster 102 and as remote data store 130 in client cluster 104). This enables multiple client clusters to store data in a single shared data store.

In other examples, system 100 includes one or more server clusters that do not host any components for performing computations, operations, or the like (e.g., VCIs) and include only shared data stores that can be mounted as remote data stores by client clusters in the system. Additionally, or alternatively, the system 100 includes one or more client clusters that include no local data store and are configured to use mounted remote data stores for all data storage associated with the cluster components therein, such as hosted VCIs. It should be understood that more, fewer, or different combinations of cluster configurations may be used in a system without departing from the description herein.

Figure 2:
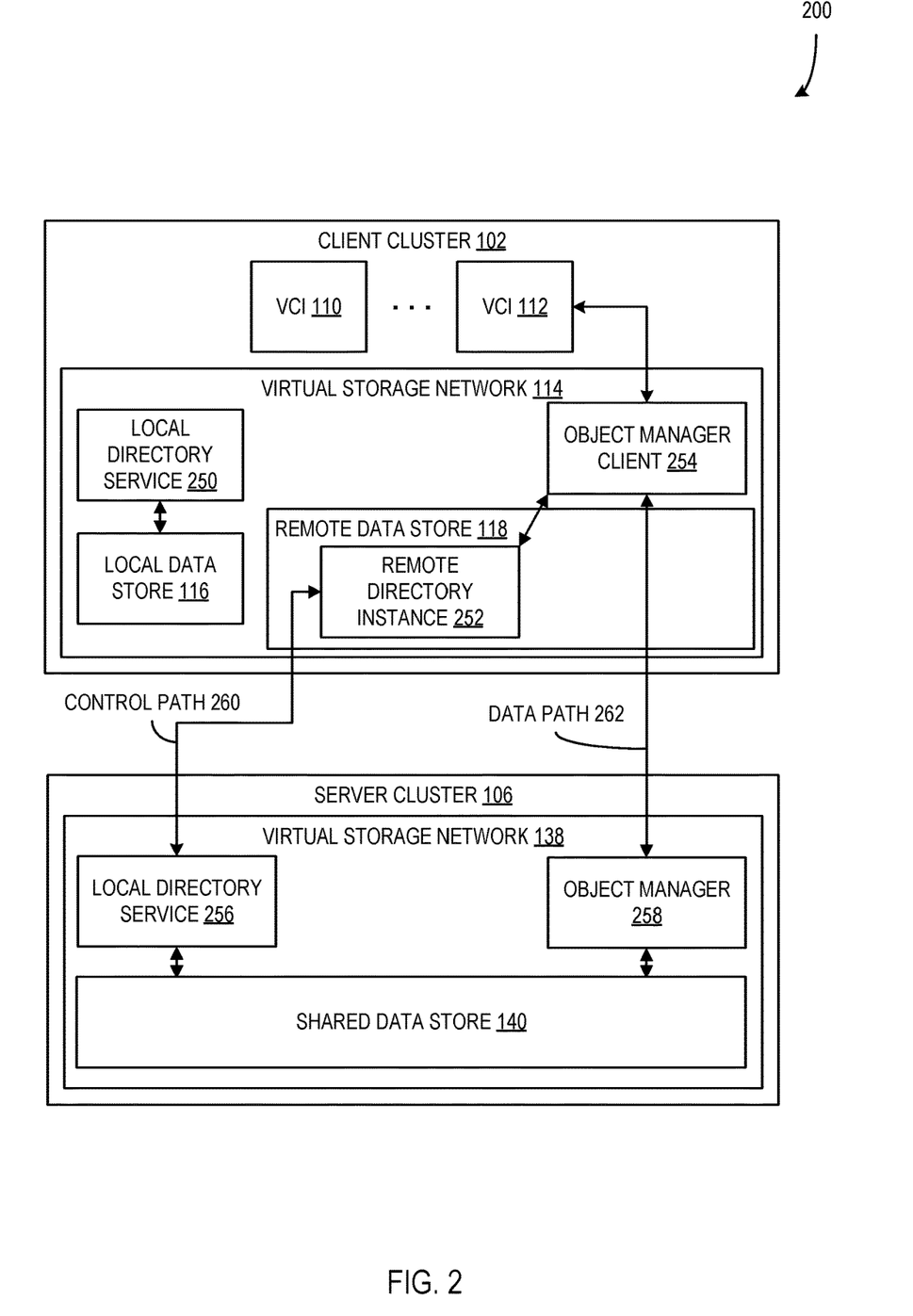
FIG. 2 is a block diagram illustrating a system configured for mounting a remote data store in a client cluster based on established control and data paths from a shared data store of a server cluster according to an embodiment.

FIG. 2 is a block diagram illustrating a system 200 configured for mounting a remote data store 118 in a client cluster 102 based on established control and data paths 260 and 262 from a shared data store 140 of a server cluster 106 according to an embodiment. In some examples, the client cluster 102 and server cluster 106 are configured as described with respect to FIG. 1 (e.g., server cluster 106 may be configured to host VCIs 134-136 as illustrated in FIG. 1, but they are not illustrated here for the sake of clarity).

In addition to the local data store 116 and the remote data store 118, the virtual storage network 114 of the client cluster 102 includes a local directory service 250 and an object manager client 254. In some examples, the local directory service 250 and the local directory service 256 of the virtual storage network 138 of the server cluster 106 are configured to include Cluster Monitoring, Membership, and Directory Services (CMMDS) configured to operate with data stores in vSAN-based networks 114 and 138 respectively. The local directory service 25 stores metadata and/or other information associated with the structure and/or location of data stored in the local data store 116. For instance, the local directory service 250 may include up-to-date address information (e.g., Internet Protocol (IP) addresses or other types of addresses) of data objects and/or other data structures within the local data store 116. Similarly, the local directory server 256 may include up-to-date address information of data objects and/or other data structures within the shared data store 140 and/or location or address information associated with accessing the object manager 258.

The remote data store 118 of the client cluster 102 is configured to include a remote directory instance 252 and make use of the object manager client 254 when establishing and making use a control path 260 and a data path 262 between the remote data store 118 and the shared data store 140 as described herein. During the process of mounting the shared data store 140 as the remote data store 118 on the client cluster 102, the control path 260 is established, via one or more interfaces, between the virtual storage network 138 of the server cluster 106 and the virtual storage network 114 of the client cluster 102. Establishing the control path 260 further includes the creation of the remote directory instance 252 and the linking of the remote directory instance 252 to the local directory service 256, such that at least a portion of the information stored in the local directory service 256, such as the address information of data structures in the shared data store 140, access information associated with the object manager 258, and/or other associated metadata (e.g., key-value mappings, data identifying physical nodes in the cluster, network interfaces, configuration information for objects in the cluster, location information for storage components, rates and/or sizes associated with components, where objects are served at any point in time through a particular object manager, etc.).

In some examples, a directory service resolver component of the remote directory instance 252 is configured to resolve logical identifiers or addresses to specific nodes for data operation routing via the data path 262 as described herein. The directory service resolver is further configured to monitor mappings of logical addresses to specific nodes and interfaces thereof on an ongoing basis via subscription to the directory instance 252 of the client cluster 102. The object manager client 254 may be configured to interact with the directory service resolver to obtain routing information. The directory service resolver may further maintain a cache of the mappings. In further examples, a separate directory service resolver cache is maintained for each cluster.

In other words, a component in the client cluster, such as the directory service resolver component or the object manager client 254, can selectively subscribe to one or more entries in the client directory service so that they get notified if changes are made to those entries. On the other hand, all changes to the server directory service pertaining to the client are pushed to the client cluster unconditionally, which may be referred to as replication.

In some examples, the information transferred from the local directory service 256 to the remote directory instance 252 is used by the virtual storage network 114 to establish the data path 262, including generating and/or configuring the object manager client 254 to interact with the object manager 258 of the shared data store 140 via the established data path 262. For instance, address information or other access information may be included in the remote directory instance 252 that indicates a location of the object manager 258 and/or an interface with which the object manager 258 can be interacted and/or contacted. The object manager client 254 is configured to interact with the object manager 258 to send and receive data operations and/or other data path-based messages in order to enable the use of the shared data store 140 by entities on the client cluster 102. In examples where the local directory service 256 and the associated remote directory instance 252 are configured as CMMDS-based services, such configuration enables the remote directory instance 252 to be a partial or complete replication or copy of the local directory service 256 of the server cluster 106 to support data path operations, file system operations (e.g., Object Store File System (OSFS) operations), and/or other management operations of the shared data store 140 of the server cluster 106.

Figure 3:
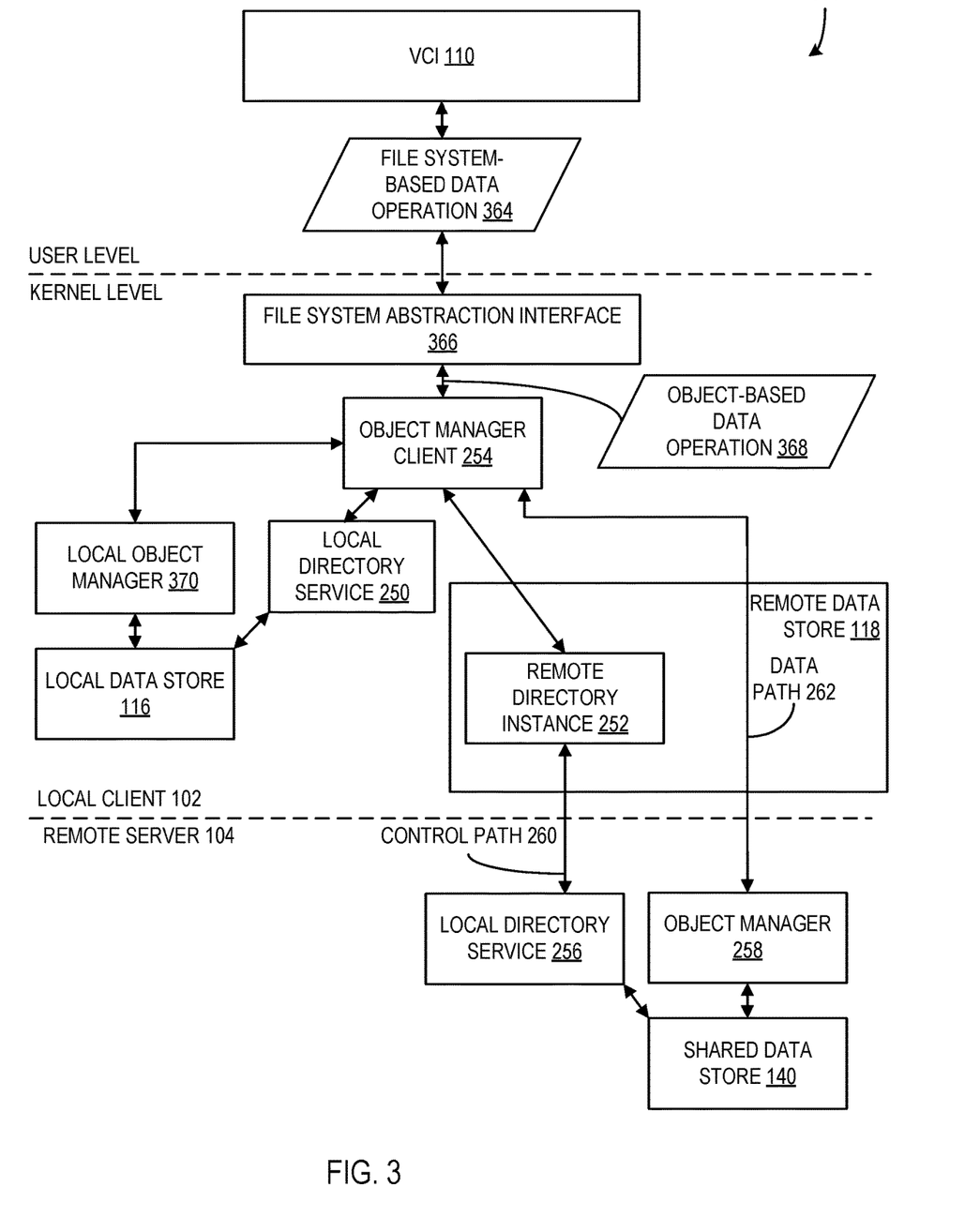
FIG. 3 is a block diagram illustrating a system for routing of a data operation from a VCI of a client cluster to a local data store and/or a shared data store of a remote server cluster according to an embodiment.

FIG. 3 is a block diagram illustrating a system 300 for routing of a data operation 364 from a VCI 110 of a client cluster to a local data store 116 and/or a shared data store 140 of a remote server cluster according to an embodiment. In some examples, the system 300 is a subsystem of the systems 100 and/or 200 of FIGS. 1 and 2 respectively. The VCI 110 is configured to send file system-based data operation 364 to be performed on one of the local data store 116 or remote data store 118. The data operation 364 may include a write operation configured to write data to the targeted data store, a read operation configured to read data from the targeted data store, an operation for creating a directory, and/or creating a file, etc. The VCI 110, as illustrated, is hosted in the user level of the client cluster and is configured to send and receive file system-based data operations and/or messages, wherein stored data is referred to according to a hierarchical file system (e.g., folders that contain other folders and/or files of data) or the like. Further, it should be understood that, while the VCI 110 is illustrated at the user level, in some examples, the VCI 110 includes both user-level and kernel-level components, such that, depending on the type of operation, the operation 364 may originate from either the user-level components or the kernel-level components (e.g., object lifecycle operations such as creation and deletion may originate from the user level while data operations such as read and write operations may originate from both levels). Whether the data operation 364 is targeted at the local data store 116 or the remote data store 118, the format of the data operation 364 is substantially the same, such that the VCI 110 may be agnostic of whether the data operation 364 is targeted at a local data store 116 or a remote data store 118 and, thereby, a shared data store 140 on a remote server cluster as described herein.

The data operation 364 is provided to a file system abstraction interface 366 of the client cluster that is configured to receive file system-based data operations and transform them into object-based data operations (e.g., data operations configured for compatibility with object-based data storage for which the data stores 116, 118, and 140 are configured) to be routed to object manager client modules (e.g., object manager client 254) at the kernel level of the client cluster as illustrated. The object-based data operation 368 is routed to the object manager client 254 when the data operation 368 is targeted at the local data store 116 or when the data operation 368 is targeted at the remote data store 118. In some examples, the file system abstraction interface 366 is configured to receive data operations from entities in the user level that are in a local data store-based format (e.g., a format that includes a target data store indicator that points to a specific data store within the client cluster, whether that be a local data store of the client cluster or a remote data store of the client cluster that is linked to a shared data store elsewhere) and to route the data operations to either a local data store or a remote data store based on the information in the data operation. As a result, entities on the user level that provide the data operations may be agnostic regarding whether the data operations are being routed to a local data store or a remote data store.

In some examples, the abstraction interface 366 takes the form of one or more file system containers (e.g., OSFS containers) for hosts in the client cluster on behalf of the shared data store in the server cluster. The file system containers are responsible for maintaining the runtime mapping (e.g., using the remote directory instance 252) between the remote data store 118 instantiated on the client cluster and the shared data store 140 on the server cluster. This mapping enables all control path and data path operations targeting the remote data store 118 to be redirected to the shared data store 140. Ultimately, a manager or controller module holds the source of truth for the mapping and pushes the mapping down through a host synchronization process to ensure each host in the client cluster has a consistent view of the real-time mapping. On the host side, the file system kernel module receives the mapping from a manager module (e.g., vSAN VMKCTL) and keeps the state in the kernel. Hosts cache the mapping received from the file system kernel module. The file system user space daemon sits at the junction of various components and is stateless with respect to the mapping. The file system user space daemon gets the mapping from file system kernel module on a per operation basis involving "lookup" and/or "read directory" operations and from hosts for namespace operations such as create, delete, and rename.

In some examples, the mapping includes the container ID and an alias indicator (e.g., "aliasOf" tuple). The alias indicator is a property introduced for use with logical data stores which provides a namespace that is separate from that of the default local data store for the purpose of role-based access control. Since logical data stores share the same physical cluster with the default local data store, they do not contribute additional capacity beyond which is provided by the default local data store. The alias indicator field takes the form of a file system container ID that identifies the default local data store, which is also the cluster UUID of the cluster. In the case of remote data stores, the alias indicator field is used to identify the server cluster from which the shared data store is being mounted. From a capacity accounting perspective, a remote data store is as much an alias of the shared data store it is mounting as the logical data store is to the default local data store. In addition to the server cluster, the mapping also identifies the shared data store being mounted (e.g., whether it is a logical or default data store). To do that, the remote data store uses the same container ID as the shared data store it is mounting.

In examples where the object-based data operation 368 is routed to the local data store 116 along the illustrated local data path, the data operation 368 may be transferred between the object manager client 254, the associated local object manager 370, and the local data store 116 where the data operation 368 is performed (e.g., data is written and/or read according to instructions of the data operation 368). The local directory service 250 is configured to store network location information and other metadata associated with the local data store 116 and the local object managers and clients associated therewith and it may be accessed by the components of the data path for use in accurately routing the object-based data operation 368.

Alternatively, in examples where the data operation 368 is routed to the remote data store 118, the operation 368 is routed to the object manager client 254 and then along data path 262 to the object manager 258 of the shared data store 140 of the remote server cluster, as described herein. The remote directory instance 252 includes network location information and other metadata associated with the shared data store 140 and object manager 258 obtained from the local directory service 256 on the server cluster and may be accessed by the object manager client 254 for use in accurately routing the object-based data operation 368 to the shared data store 140. Upon arrival, the data operation 368 may be performed on the shared data store 140 and any response of the data operation 368 may be returned along the illustrated data path 262 to the client cluster and then back to the VCI 110.

In some examples, the object manager and associated client components are configured to include Distributed Object Manager (DOM) modules (e.g., based on VMWARE DOM architecture). DOM modules used within the data path of a remote data store as described herein may include DOM clients (e.g., object manager client 254), DOM owners (e.g., object manager 258), and/or DOM components, which may be included in or separate from the object manager 258 as illustrated. In such examples, establishing the data path 262 and creating an associated data object includes picking a healthy and reachable host from the server cluster and instantiating the DOM owner on that host. Once the data object to be managed by the DOM owner is fully created, the DOM owner may abdicate to one of the hosts of the server cluster that contains data components of the created data object. A Cluster Level Object Manager (CLOM) of the server cluster may attempt to balance data component placement across the cluster. Further, accessing data objects that already exist on shared data stores may include DOM clients on client clusters determining server clusters of data objects from an input/output control (IOCTL) module initially. DOM clients may also store the associated server clusters and any other metadata for future use (e.g., in a remote directory instance 252).

The DOM components may be arranged such that the DOM client is located on the client cluster and the DOM owner and associated DOM components are located on the server cluster. It should be understood that, in other examples, different arrangements may be used without departing from the description herein. For instance, the DOM client and DOM owner may be located on the client cluster while only the DOM components are located on the server cluster. Such an arrangement requires no network hops between the DOM client and DOM owner, but the client cluster must have full read-write access to the directory service of the server cluster, the owner must consult with a local Cluster Level Object Manager Daemon (CLOMD) for data placement decisions, the client must join the server cluster for DOM owner election and failover, and the arrangement prevents shared access of the same data object within or across clusters. In this "smart client" arrangement, the client is kept out of the server cluster and the server is largely agnostic of the client and shared access of the same object within or across clusters is enabled.

Figure 4:
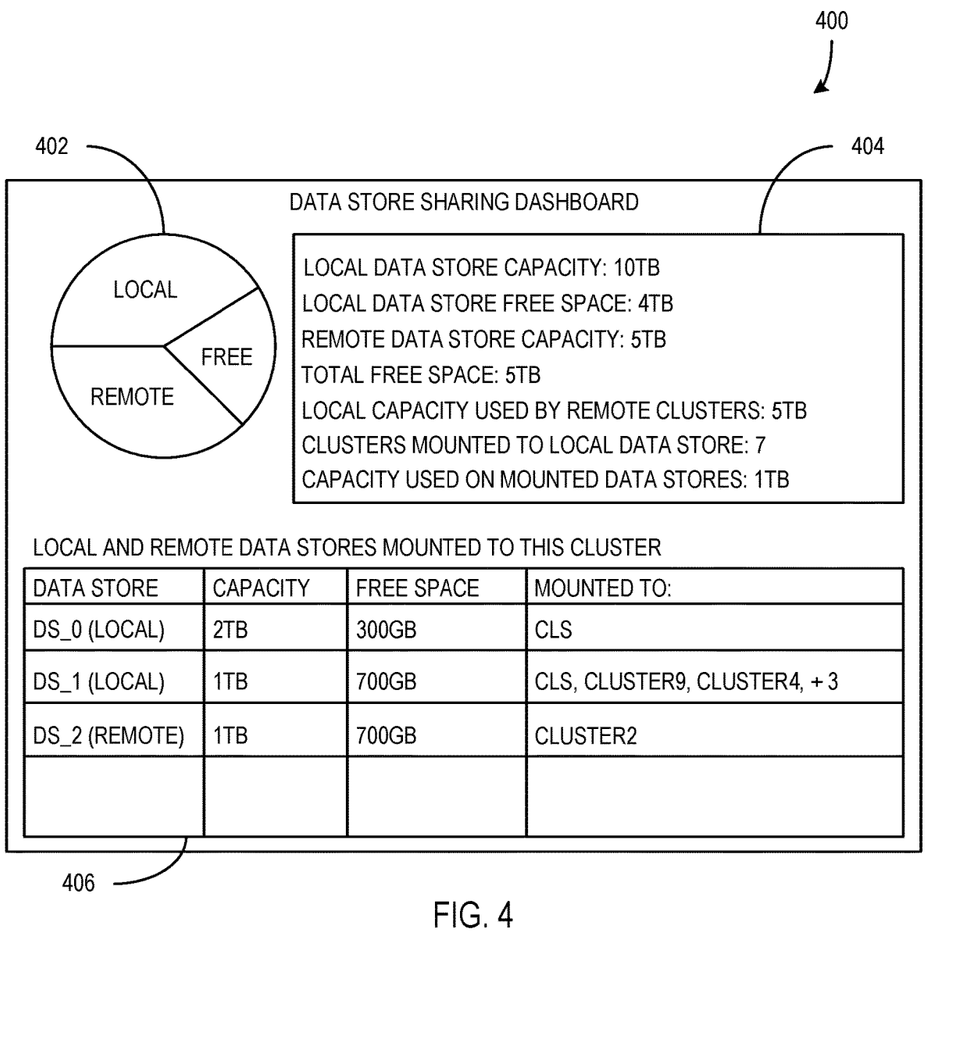
FIG. 4 is a diagram illustrating a data store sharing dashboard graphical user interface (GUI) configured to display data store sharing information according to an embodiment.

FIG. 4 is a diagram illustrating a data store sharing dashboard graphical user interface (GUI) 400 configured to display data store sharing information according to an embodiment. In some examples, the data store sharing dashboard GUI 400 is associated with a cluster (e.g., client cluster 102, server cluster 106) and is configured to display information about the current state of storage capacity usage in the cluster. The GUI 400 includes a pie chart 402 that provides a visualization of the fractional amounts of the capacity of the cluster that are occupied by local data storage, remote data storage, and/or capacity of the cluster that is currently free space. An associated GUI component 404 provides specific data values reflecting the information that is provided by the pie chart 402. For instance, as illustrated, the cluster that is described by the GUI 400 has a local data store capacity of 10 terabytes (TB). 4 TB of that storage capacity is free space. The cluster further has a remote data store capacity of 5 TB. The total free space of the cluster is 5 TB. The local capacity used by remote clusters is 5 TB and the number of clusters mounted to the local data store is seven. The remote capacity used by this cluster on mounted data stores is 1 TB. In other examples, more, less, or different information may be displayed about the overall usage of the associated cluster without departing from the description herein.

The GUI 400 further includes a table 406 that displays information about the local and remote data stores that are mounted on the cluster. The illustrated table 406 includes example information about three data stores, DS_0, DS_1, and DS_2. DS_0 and DS_1 are local data stores and DS_2 is a remote data store. The information displayed about each of the data stores include total capacity, current free space, and clusters to which each data store is mounted. In other examples, more, less, or different information may be displayed about the data stores without departing from the description herein.

In some examples, the GUI 400 is further configured to enable users to select specific clusters to view (e.g., cause the GUI 400 display overall capacity usage information and mounted data store information about a specific cluster), change configurations and/or settings of clusters or data stores (e.g., change whether a data store is able to be mounted remotely, change how much capacity of a data store is able to be used remotely, etc.), and/or mount, unmount, or otherwise change how data stores are mounted on clusters. This may include enabling a user to select a data store of a cluster, identify client clusters to which the selected data store may be mounted, validate the potential client clusters, and, if validated, mount the selected data store on one or more of the client clusters as described herein. The GUI 400 may further enable users to control and/or manage the sharing of data store capacity between clusters in other ways without departing from the description herein.

Figure 5:
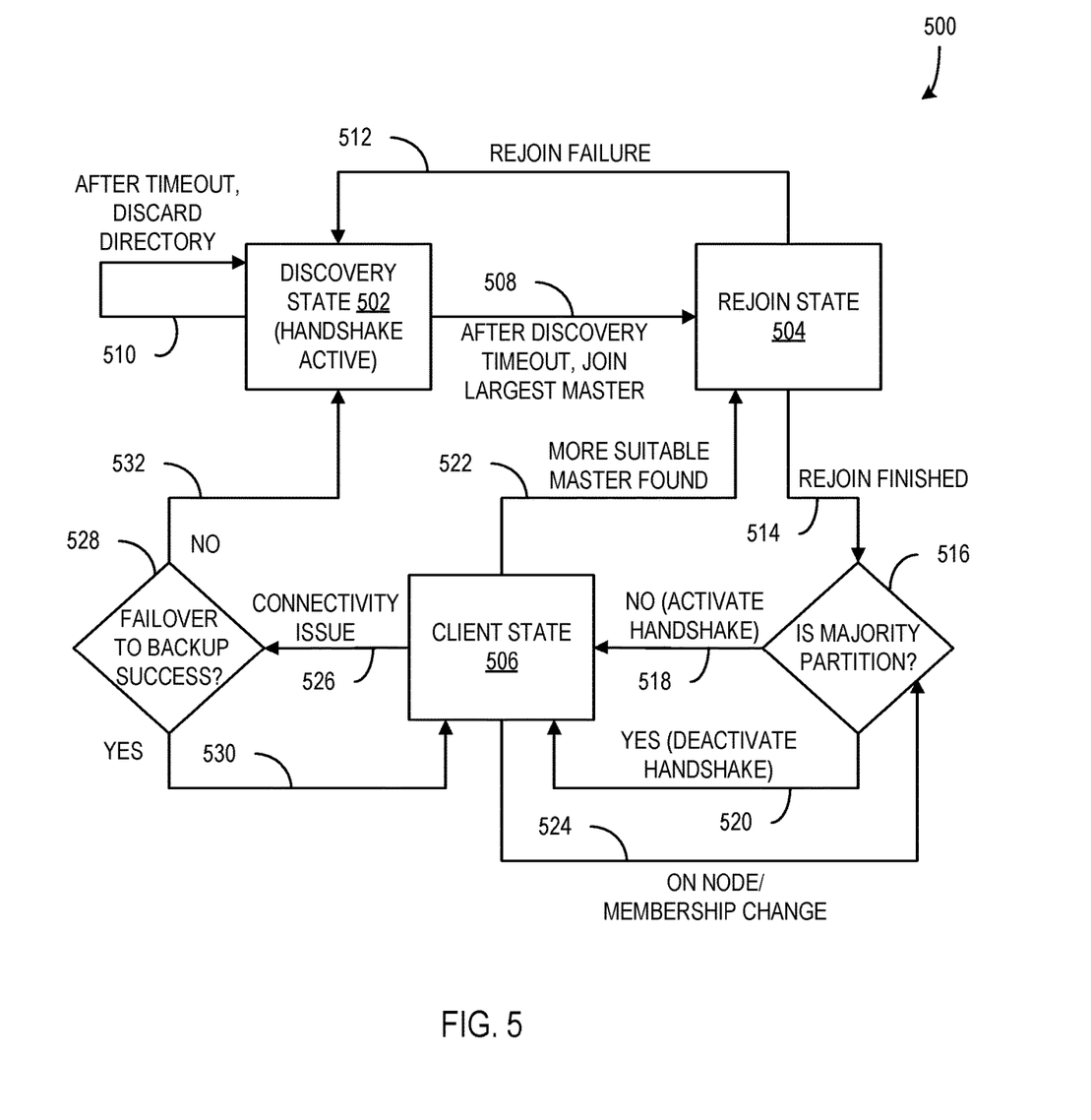
FIG. 5 is a block diagram illustrating states of operation of a remote directory client of a remote data store according to an embodiment.

FIG. 5 is a block diagram 500 illustrating states of operation of a remote directory client of a remote data store according to an embodiment. It should be understood that the remote directory client configured to operate based on these described states may be associated with a remote directory instance of a remote data store such as remote directory instance 252 of remote data store 118 described herein. In some examples, the remote directory client is responsible for joining a directory service that is configured by the management plane. The discovery functionality of the remote directory client refers to the runtime state of the server cluster, e.g., partitions, cluster membership, and role of the hosts.

In the discovery state 502, the remote directory client is configured to activate a discovery protocol using a list of addresses (e.g., unicast addresses) for each host in the server cluster. The client attempts to discover server cluster configuration, including cluster membership, available partitions and/or capacity, and identifying a master host for each partition, by sending out discovery messages to each known host in the server cluster (e.g., by User Datagram Protocol (UDP)). After the client selects an optimal server cluster partition and discovers its master host, it initiates a handshake with the master host and registers itself with, or subscribes to, the master host as an interested client. Selecting an optimal server cluster may include selecting and joining the largest master host or otherwise the most optimal host found at the point a defined discovery timeout period ends (e.g., ten seconds), as illustrated at 508. Alternatively, at 510, if the client becomes isolated from the server cluster and unable to join any server host or partition a defined timeout period (e.g., the DISCOVERY_APD timeout period), the client is configured to effectively disable the active directory by discarding all content and then it may resume the discover state 502.

At the rejoin state 504, the client receives an initial snapshot of the directory service information of the server cluster with which it is joined. In some examples, the client merges the new directory snapshot with its active directory information (e.g., the information currently in the remote directory instance). If the rejoin process fails, the client returns to the discover state 502 at 512. Alternatively, if the rejoin process finishes successfully at 514, the client checks if the joined partition is a majority partition (e.g., a server cluster partition that includes, as member nodes, a majority of all nodes configured in the server cluster) at 516. If the partition to which the client is joined is not a majority partition, the client transitions to the client state 508 and background discover handshakes are activated at 518. Alternatively, if the partition to which the client is joined a majority partition, the client transitions to the client state 508 and background discovery handshakes are deactivated at 520.

While the client is in the client state 506, it is configured to receive updates from the master of the server cluster to which it is joined and updates the stored network location data and metadata of its associated directory instance. The client is also configured to provide read-only access to that information to entities that are local to the client cluster.

If background discovery handshakes are active while the client is in the client state 506, a process of the client periodically searches for another host and/or partition that may be more suitable than the host and/or partition to which the client is currently joined. If a more suitable host and/or partition is found by the background discover process, the client transitions to the rejoin state 504 at 522 to rejoin with the identified more suitable host and/or partition (e.g., a master host of a majority partition that is discovered while the client is connected to a master host of a non-majority partition).

If the client in the client state 506 detects a node and/or membership change of the host and/or partition to which it is joined at 524, it rechecks if the partition is a majority partition at 516.

If the client loses connectivity to the master host to which it is joined at 526, the client attempts to failover to a backup host of the master host at 528. If the client is successful, the client returns to the client state 506 at 530. Alternatively, if the client fails to switch over to a backup host at 528, the client transitions to the discover state 502 at 528.

In some examples, the remote directory client is configured to continue offering access to its active directory information after it has lost connection with the master of the current partition. This may last until the client discovers a different master and rejoins with it. Further, the remote directory client is configured to be registered with only one server partition at a time, even if it is able to reach multiple server partitions. In some examples, the remote directory client is configured to operate as a CMMDS client (e.g., based on VMWARE CMMDS architecture).

Figure 6:
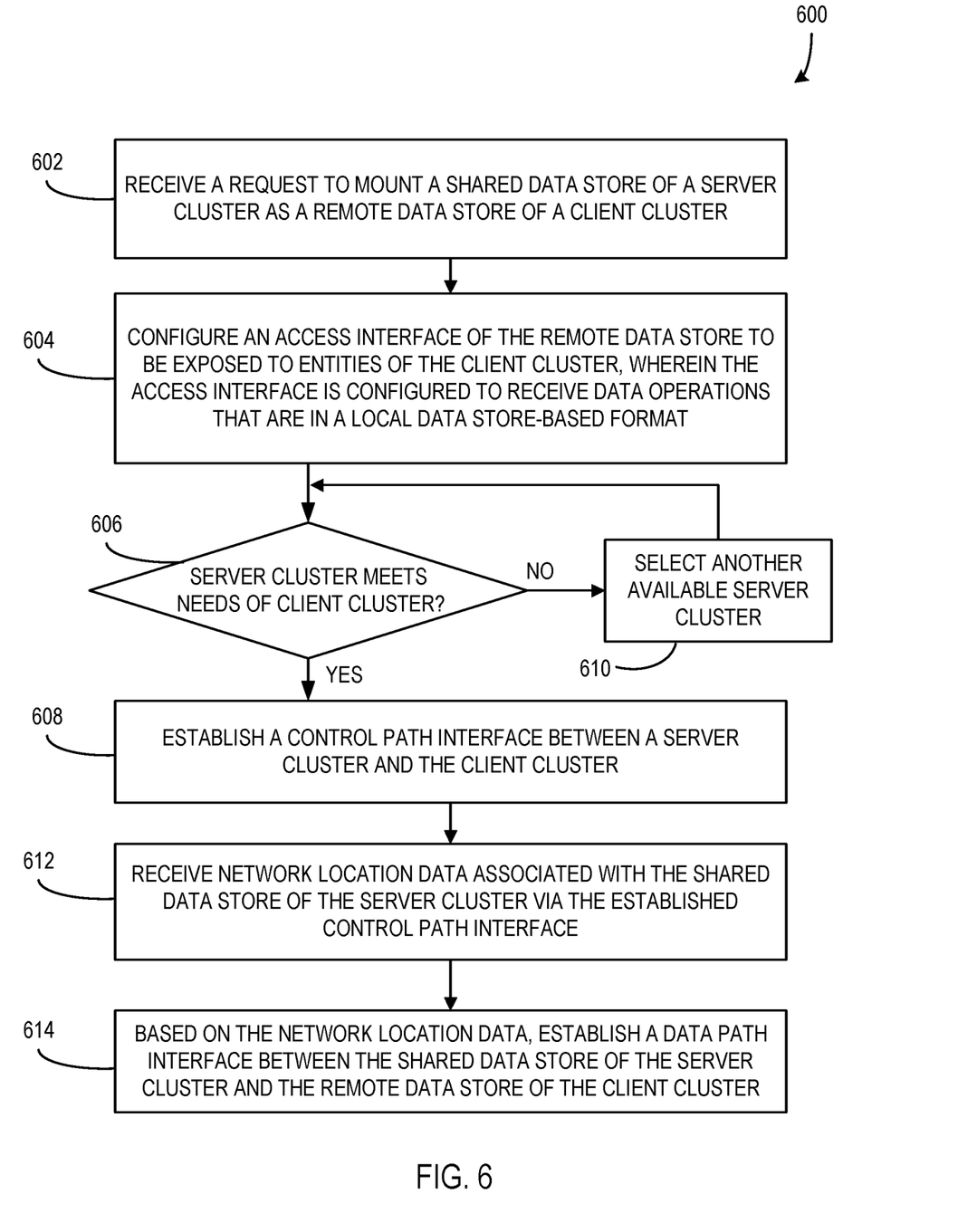
FIG. 6 is a flow chart illustrating a computerized method for remotely mounting a shared data store as a remote data store on a client cluster according to an embodiment.

FIG. 6 is a flow chart illustrating a computerized method 600 for remotely mounting a shared data store as a remote data store on a client cluster according to an embodiment. In some examples, the method 600 is executed by or otherwise performed by one or more components of a system such as systems 100, 200, and/or 300 of FIGS. 1, 2, and/or 3, respectively. A 602, a request is received to mount a shared data store of a server cluster as a remote data store of a client cluster. In some examples, the request may be received from a controller component of the client cluster in response to a need for data storage space that is not available within the client cluster.

At 604, an access interface of the remote data store is configured to be exposed to entities of the client cluster, wherein the access interface is configured to receive data operations that are in a local data store-based format. Such an interface is configured to enable entities on the client cluster to interact with the remote data store in the same manner as a local data store of the client cluster, without having to alter any established local storage semantics and ensuring that entities on the client cluster need only be configured to interact with data stores in a single, unified way.

At 606, if the server cluster meets the needs of the client cluster, the process proceeds to 608. Alternatively, if the server cluster does not meet the needs of the client cluster, another available server cluster is selected at 610.

At 608, a control path interface (e.g., control path 260) between the server cluster and the client cluster is established and, at 612, network location data associated with the shared data store of the server cluster is received via the established control path interface. In some examples, the establishment of the control path interface and transfer of network location data further includes the storing of the received network location data in a local instance on the client cluster (e.g., remote directory instance 252) and maintenance of the local instance, such that up-to-date network location data is maintained thereon. For instance, the local instance may replicate or otherwise be subscribed to a directory service on the server cluster such that changes on the directory service are pushed to the local instance as described herein.

At 614, based on the network location data, a data path interface (e.g., data path 262) is established between the shared data store of the server cluster and the remote data store of the client cluster. Based on the established data path, the shared data store is "mounted" as the remote data store on the client cluster, such that entities of the client cluster are enabled to interact with the shared data store as if it were a local data store on the client cluster via the abstraction interface and established data path interface. In some examples, the data path interface includes and/or makes use of an object manager module stack, which may include an object manager client (e.g., object manager client 254) on the client cluster and an associated object manager (e.g., object manager 258) on the server cluster that are configured to enable the performance of data operations on the shared data store as described herein.

Figure 7:
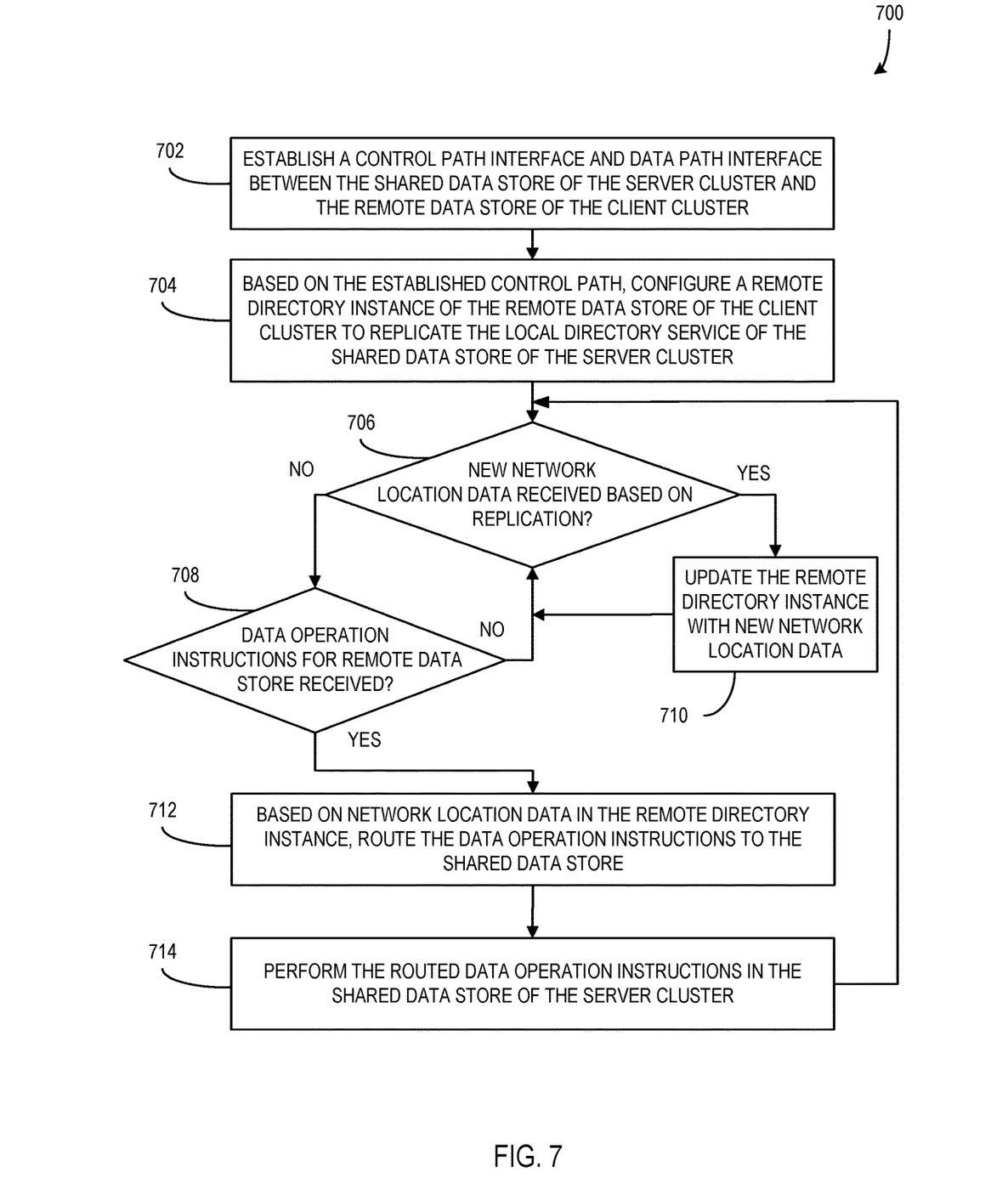
FIG. 7 is a flow chart illustrating a computerized method for maintaining a remote directory instance on a client cluster and routing data operation instructions to a shared data store based on the remote directory instance according to an embodiment.

FIG. 7 is a flow chart illustrating a computerized method 700 for maintaining a remote directory instance on a client cluster and routing data operation instructions to a shared data store based on the remote directory instance according to an embodiment. In some examples, the method 700 is executed by or otherwise performed by one or more components of a system such as systems 100, 200, and/or 300 of FIGS. 1, 2, and/or 3, respectively. At 702, a control path interface and data path interface are established between the shared data store of the server cluster and the remote data store of the client cluster. It should be understood that the establishment of the control and data path interfaces may be performed in substantially the same manner as described herein.

At 704, based on the established control path, a remote directory instance of the remote data store of the client cluster is configured to replicate the local directory service of the shared data store of the server cluster. At 706, if new network location data is received based on the replication, the remote directory instance is updated with the new network location data at 710 and the process returns to 706 to detect for more new network location data. Alternatively, if no new network location data is received at 706, the process proceeds to 708.

If, at 708, data operation instructions for the remote data store are received, the process proceeds to 712. Alternatively, if no instructions for the remote data store are received, the process returns to 706.

At 712, based on the network location data in the remote directory instance, the data operation instructions are routed to the shared data store and, at 714, the routed data operation instructions are performed on the shared data store of the server cluster. In some examples, results of the data operation instructions (e.g., query results of a read operation or success indicator associated with a write operation) may be returned to the client cluster via the established data path interface.

Exemplary Operating Environment

Aspects of the disclosure are operable in both virtualized and non-virtualized environments. In virtualized examples that involve a hardware abstraction layer on top of a host computer (e.g., server), the hardware abstraction layer allows multiple containers to share the hardware resource. These containers, isolated from each other, have at least a user application running therein. The hardware abstraction layer thus provides benefits of resource isolation and allocation among the containers. In some examples, virtual machines (VMs) are used alternatively or in addition to the containers, and hypervisors are used for the hardware abstraction layer. In these examples, each VM generally includes a guest operating system in which at least one application runs.

For the container examples, it should be noted that the disclosure applies to any form of container, such as containers not including a guest operating system (OS), referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources may be isolated, services restricted, and processes provisioned to have a private view of the operating system with their own process ID space, file system structure, and network interfaces. Multiple containers may share the same kernel, but each container may be constrained to only use a defined amount of resources such as CPU, memory and I/O.

Figure 8:
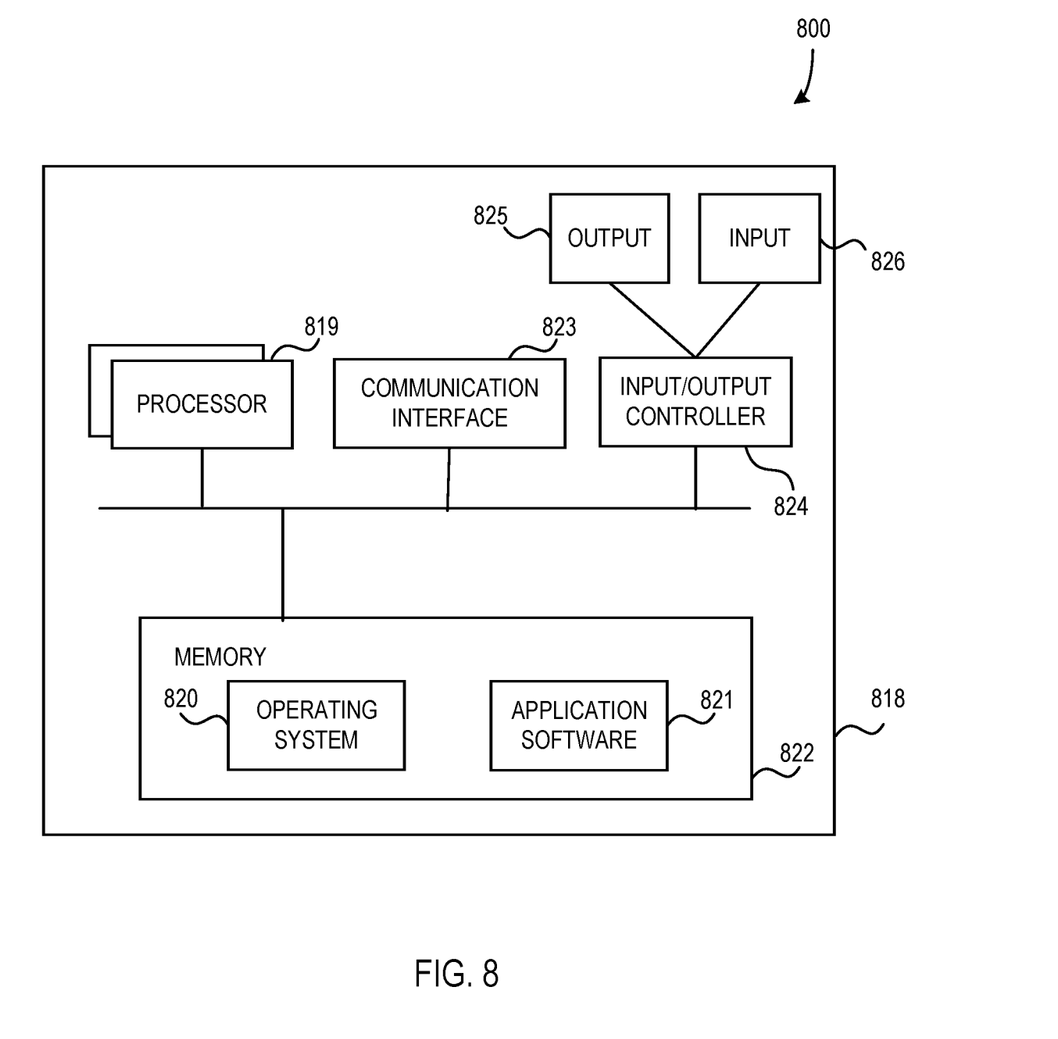
FIG. 8 illustrates a computing apparatus according to an embodiment as a functional block diagram.

The present disclosure is operable with a computing apparatus according to an embodiment as a functional block diagram 800 in FIG. 8. In an embodiment, components of a computing apparatus 818 may be implemented as a part of an electronic device according to one or more embodiments described in this specification. The computing apparatus 818 comprises one or more processors 819 which may be microprocessors, controllers or any other suitable type of processors for processing computer executable instructions to control the operation of the electronic device. Alternatively, or in addition, the processor 819 is any technology capable of executing logic or instructions, such as a hardcoded machine. Platform software comprising an operating system 820 or any other suitable platform software may be provided on the apparatus 818 to enable application software 821 to be executed on the device. According to an embodiment, mounting a shared data store on a server cluster for use as a remote data store on a client cluster as described herein may be accomplished by software, hardware, and/or firmware.

Computer executable instructions may be provided using any computer-readable media that are accessible by the computing apparatus 818. Computer-readable media may include, for example, computer storage media such as a memory 822 and communications media. Computer storage media, such as a memory 822, include volatile and non-volatile, removable and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 822) is shown within the computing apparatus 818, it will be appreciated by a person skilled in the art, that the storage may be distributed or located remotely and accessed via a network or other communication link (e.g. using a communication interface 823).

The computing apparatus 818 may comprise an input/output controller 824 configured to output information to one or more output devices 825, for example a display or a speaker, which may be separate from or integral to the electronic device. The input/output controller 824 may also be configured to receive and process an input from one or more input devices 826, for example, a keyboard, a microphone or a touchpad. In one embodiment, the output device 825 may also act as the input device. An example of such a device may be a touch sensitive display. The input/output controller 824 may also output data to devices other than the output device, e.g. a locally connected printing device. In some embodiments, a user may provide input to the input device(s) 826 and/or receive output from the output device(s) 825.

The functionality described herein can be performed, at least in part, by one or more hardware logic components. According to an embodiment, the computing apparatus 818 is configured by the program code when executed by the processor 819 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system for remotely mounting a shared data store as a remote data store on a client cluster comprising: at least one processor of the client cluster; and at least one memory comprising computer program code, the at least one memory and the computer program code configured to, with the at least one processor, cause the at least one processor to: receive a request to mount the shared data store of a server cluster as a remote data store of the client cluster, wherein the server cluster is remotely located across a network from the client cluster; configure an abstraction interface of the remote data store to be exposed to entities of the client cluster, wherein the abstraction interface is configured to receive data operations that are in a local data store-based format; establish a control path interface between the server cluster and the client cluster; receive network location data associated with the shared data store of the server cluster via the established control path interface; and based on the network location data, establish a data path interface between the shared data store of the server cluster and the remote data store on the client cluster, whereby the shared data store of the server cluster is mounted as the remote data store of the client cluster such that data operations directed to the abstraction interface of the remote data store of the client cluster are routed to the shared data store of the server cluster via the established data path interface.

A computerized method for remotely mounting a shared data store as a remote data store on a client cluster comprises: receiving, by a processor of the client cluster, a request to mount the shared data store of a server cluster as a remote data store of the client cluster, wherein the server cluster is remotely located across a network from the client cluster; configuring, by the processor, an abstraction interface of the remote data store to be exposed to entities of the client cluster, wherein the abstraction interface is configured to receive data operations that are in a local data store-based format; establishing, by the processor, a control path interface between the server cluster and the client cluster; receiving, by the processor, network location data associated with the shared data store of the server cluster via the established control path interface; and based on the network location data, establishing, by the processor, a data path interface between the shared data store of the server cluster and the remote data store on the client cluster, whereby the shared data store of the server cluster is mounted as the remote data store of the client cluster such that data operations directed to the abstraction interface of the remote data store of the client cluster are routed to the shared data store of the server cluster via the established data path interface.

One or more non-transitory computer storage media having computer-executable instructions for remotely mounting a shared data store as a remote data store on a client cluster, upon execution by a processor, cause the processor to at least: receive a request to mount the shared data store of a server cluster as a remote data store of the client cluster, wherein the server cluster is remotely located across a network from the client cluster; configure an abstraction interface of the remote data store to be exposed to entities of the client cluster, wherein the abstraction interface is configured to receive data operations that are in a local data store-based format; establish a control path interface between the server cluster and the client cluster; receive network location data associated with the shared data store of the server cluster via the established control path interface; and based on the network location data, establish a data path interface between the shared data store of the server cluster and the remote data store on the client cluster, whereby the shared data store of the server cluster is mounted as the remote data store of the client cluster such that data operations directed to the abstraction interface of the remote data store of the client cluster are routed to the shared data store of the server cluster via the established data path interface.

Alternatively, or in addition to the other examples described herein, examples include any combination of the following:

further comprising: receiving, by the processor, instructions to perform a data operation on the remote data store of the client cluster from an entity in the client cluster via the abstraction interface; and routing, by the processor, the instructions to the shared data store of the server cluster based on the established data path interface; wherein the server cluster is configured to perform the data operation in the shared data store based on the routed instructions.

wherein establishing the control path interface includes instantiating a local directory copy on the client cluster associated with a data store directory of the server cluster; wherein transferring the network location data includes populating the local directory copy with network location data of the data store directory of the server cluster such that the network location data of the data store directory of the server cluster is replicated in the local directory copy; and wherein the server cluster is configured to push changes made to the data store directory to the client cluster based on the replication and the client cluster is configured to update the local directory copy with the pushed changes.

wherein the abstraction interface of the remote data store is configured to receive data operations formatted for compatibility with file-based data storage from entities at a user level of the client cluster and to convert received data operations into operations formatted for compatibility with object based data storage for use with the remote data store at a kernel level of the client cluster.

further comprising: identifying the server cluster with which to establish the control path interface from a plurality of available server clusters with shared data stores; wherein establishing the control path interface between the identified server cluster and the client cluster is based on determining that the identified server cluster includes a shared data store that satisfies a data capacity requirement of the client cluster.

wherein establishing the data path interface includes: instantiating an object manager client associated with the remote data store; identifying a network location of an object manager entity associated with the shared data store of the server cluster based on the received network location data; linking the object manager client with the object manager entity based on the identified network location via a connection across the network; requesting, by the object manager client, data store layout data associated with the shared data store from the object manager entity; receiving, by the object manager client, the data store layout data associated with the shared data store; and establishing a data path interface between the object manager client and at least one portion of the shared data store based on the received data store layout data.

wherein the data store of the server cluster is mounted as a remote data store for a plurality of client clusters.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for receiving, by a processor of the client cluster, a request to mount the shared data store of a server cluster as a remote data store of the client cluster, wherein the server cluster is remotely located across a network from the client cluster; exemplary means for configuring, by the processor, an abstraction interface of the remote data store to be exposed to entities of the client cluster, wherein the abstraction interface is configured to receive data operations that are in a local data store-based format; exemplary means for establishing, by the processor, a control path interface between the server cluster and the client cluster; exemplary means for receiving, by the processor, network location data associated with the shared data store of the server cluster via the established control path interface; and, based on the network location data, exemplary means for establishing, by the processor, a data path interface between the shared data store of the server cluster and the remote data store on the client cluster, whereby the shared data store of the server cluster is mounted as the remote data store of the client cluster such that data operations directed to the abstraction interface of the remote data store of the client cluster are routed to the shared data store of the server cluster via the established data path interface.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method for remotely mounting a shared data store as a remote data store on a client cluster, the method comprising:

receiving, by a processor of the client cluster, a request to mount the shared data store of a server cluster as a remote data store of the client cluster, wherein the server cluster is remotely located across a network from the client cluster;

configuring, by the processor, an abstraction interface of the remote data store to be exposed to entities of the client cluster, wherein the abstraction interface is configured to receive data operations that are in a local data store-based format;

establishing, by the processor, a control path interface between the server cluster and the client cluster;

receiving, by the processor, network location data associated with the shared data store of the server cluster via the established control path interface; and based on the network location data, establishing, by the processor, a data path interface between the shared data store of the server cluster and the remote data store of the client cluster, wherein the shared data store of the server cluster is mounted as the remote data store of the client cluster and wherein data operations directed to the abstraction interface of the remote data store of the client cluster are routed to the shared data store of the server cluster via the established data path interface.

2. The method of claim 1, further comprising:

receiving, by the processor, instructions to perform a data operation on the remote data store of the client cluster from an entity in the client cluster via the abstraction interface;

routing, by the processor, the instructions to the shared data store of the server cluster based on the established data path interface; and wherein the server cluster is configured to perform the data operation in the shared data store based on the routed instructions.

3. The method of claim 1, wherein establishing the control path interface includes instantiating a local directory copy on the client cluster associated with a data store directory of the server cluster;

wherein receiving the network location data includes populating the local directory copy with network location data of the data store directory of the server cluster, wherein the network location data of the data store directory of the server cluster is replicated in the local directory copy; and wherein the server cluster is configured to push changes made to the data store directory to the client cluster based on the replication and the client cluster is configured to update the local directory copy with the pushed changes.

4. The method of claim 1, wherein the abstraction interface of the remote data store is configured to receive data operations formatted for compatibility with file-based data storage from entities at a user level of the client cluster and to convert received data operations into operations formatted for compatibility with object based data storage for use with the remote data store at a kernel level of the client cluster.

5. The method of claim 1, further comprising:

identifying the server cluster with which to establish the control path interface from a plurality of available server clusters with shared data stores; and wherein establishing the control path interface between the identified server cluster and the client cluster is based on determining that the identified server cluster includes a shared data store that satisfies a data capacity requirement of the client cluster.

6. The method of claim 1, wherein establishing the data path interface includes:

instantiating an object manager client associated with the remote data store of the client cluster;

identifying a network location of an object manager entity associated with the shared data store of the server cluster based on the received network location data;

linking the object manager client with the object manager entity based on the identified network location via a connection across the network;

requesting, by the object manager client, data store layout data associated with the shared data store from the object manager entity;

receiving, by the object manager client, the data store layout data associated with the shared data store; and establishing a data path interface between the object manager client and at least one portion of the shared data store based on the received data store layout data.

7. The method of claim 1, wherein the data store of the server cluster is mounted as a remote data store for a plurality of client clusters.

8. A computer system for remotely mounting a shared data store as a remote data store on a client cluster, the computer system comprising:

at least one processor of the client cluster; and a non-transitory computer readable medium having stored thereon program code for transferring data to another computer system, the program code causing the processor to:

receive a request to mount the shared data store of a server cluster as a remote data store of the client cluster, wherein the server cluster is remotely located across a network from the client cluster;

configure an abstraction interface of the remote data store to be exposed to entities of the client cluster, wherein the abstraction interface is configured to receive data operations that are in a local data store-based format;

establish a control path interface between the server cluster and the client cluster;

receive network location data associated with the shared data store of the server cluster via the established control path interface; and based on the network location data, establishing, by the processor, a data path interface between the shared data store of the server cluster and the remote data store of the client cluster, wherein the shared data store of the server cluster is mounted as the remote data store of the client cluster and wherein data operations directed to the abstraction interface of the remote data store of the client cluster are routed to the shared data store of the server cluster via the established data path interface.

9. The computer system of claim 8, wherein the at least one memory and the program code are configured to, with the at least one processor, further cause the at least one processor to:

receive instructions to perform a data operation on the remote data store of the client cluster from an entity in the client cluster via the abstraction interface;

route the instructions to the shared data store of the server cluster based on the established data path interface; and wherein the server cluster is configured to perform the data operation in the shared data store based on the routed instructions.

10. The computer system of claim 8, wherein establishing the control path interface includes instantiating a local directory copy on the client cluster associated with a data store directory of the server cluster;

wherein receiving the network location data includes populating the local directory copy with network location data of the data store directory of the server cluster, wherein the network location data of the data store directory of the server cluster is replicated in the local directory copy; and wherein the server cluster is configured to push changes made to the data store directory to the client cluster based on the replication and the client cluster is configured to update the local directory copy with the pushed changes.

11. The computer system of claim 8, wherein the abstraction interface of the remote data store is configured to receive data operations formatted for compatibility with file-based data storage from entities at a user level of the client cluster and to convert received data operations into operations formatted for compatibility with object based data storage for use with the remote data store at a kernel level of the client cluster.

12. The computer system of claim 8, wherein the at least one memory and the program code are configured to, with the at least one processor, further cause the at least one processor to:

identify the server cluster with which to establish the control path interface from a plurality of available server clusters with shared data stores; and wherein establishing the control path interface between the identified server cluster and the client cluster is based on determining that the identified server cluster includes a shared data store that satisfies a data capacity requirement of the client cluster.

13. The computer system of claim 8, wherein establishing the data path interface includes:

instantiating an object manager client associated with the remote data store of the client cluster;

identifying a network location of an object manager entity associated with the shared data store of the server cluster based on the received network location data;

linking the object manager client with the object manager entity based on the identified network location via a connection across the network;

requesting, by the object manager client, data store layout data associated with the shared data store from the object manager entity;

receiving, by the object manager client, the data store layout data associated with the shared data store; and establishing a data path interface between the object manager client and at least one portion of the shared data store based on the received data store layout data.

14. The computer system of claim 8, wherein the data store of the server cluster is mounted as a remote data store for a plurality of client clusters.

15. A non-transitory computer readable storage medium having stored thereon program code executable by a first computer system at a first site, the program code embodying a method comprising:

receiving a request to mount a shared data store of a server cluster as a remote data store of a client cluster, wherein the server cluster is remotely located across a network from the client cluster;

configuring an abstraction interface of the remote data store to be exposed to entities of the client cluster, wherein the abstraction interface is configured to receive data operations that are in a local data store-based format;

establishing a control path interface between the server cluster and the client cluster;

receiving network location data associated with the shared data store of the server duster via the established control path interface; and based on the network location data, establishing, by the processor, a data path interface between the shared data store of the server duster and the remote data store of the client duster, wherein the shared data store of the server duster is mounted as the remote data store of the client duster and wherein data operations directed to the abstraction interface of the remote data store of the client duster are routed to the shared data store of the server duster via the established data path interface.

16. The non-transitory computer readable storage medium of claim 15, wherein the program code further comprises:
receiving instructions to perform a data operation on the remote data store of the client cluster from an entity in the client cluster via the abstraction interface;
routing the instructions to the shared data store of the server cluster based on the established data path interface; and
wherein the server cluster is configured to perform the data operation in the shared data store based on the routed instructions.

17. The non-transitory computer readable storage medium of claim 15, wherein establishing the control path interface includes instantiating a local directory copy on the client cluster associated with a data store directory of the server cluster;
wherein receiving the network location data includes populating the local directory copy with network location data of the data store directory of the server cluster, wherein the network location data of the data store directory of the server cluster is replicated in the local directory copy; and
wherein the server cluster is configured to push changes made to the data store directory to the client cluster based on the replication and the client cluster is configured to update the local directory copy with the pushed changes.

18. The non-transitory computer readable storage medium of claim 15, wherein the abstraction interface of the remote data store is configured to receive data operations formatted for compatibility with file-based data storage from entities at a user level of the client cluster and to convert received data operations into operations formatted for compatibility with object based data storage for use with the remote data store at a kernel level of the client cluster.

19. The non-transitory computer readable storage medium of claim 15, wherein the program code further comprises:
identifying the server cluster with which to establish the control path interface from a plurality of available server clusters with shared data stores; and
wherein establishing the control path interface between the identified server cluster and the client cluster is based on determining that the identified server cluster includes a shared data store that satisfies a data capacity requirement of the client cluster.

20. The non-transitory computer readable storage medium of claim 15, wherein establishing the data path interface includes:
instantiating an object manager client associated with the remote data store of the client cluster;
identifying a network location of an object manager entity associated with the shared data store of the server cluster based on the received network location data;
linking the object manager client with the object manager entity based on the identified network location via a connection across the network;
requesting, by the object manager client, data store layout data associated with the shared data store from the object manager entity;
receiving, by the object manager client, the data store layout data associated with the shared data store; and
establishing a data path interface between the object manager client and at least one portion of the shared data store based on the received data store layout data.

* * * * *